(12) United States Patent
Cudak et al.

(10) Patent No.: US 9,552,358 B2
(45) Date of Patent: Jan. 24, 2017

(54) GUIDING A USER TO IDENTIFIED CONTENT IN A DOCUMENT

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/707,009

(22) Filed: Dec. 6, 2012

(65) Prior Publication Data

US 2014/0164414 A1 Jun. 12, 2014

(51) Int. Cl.
*G06F 17/30* (2006.01)

(52) U.S. Cl.
CPC ... *G06F 17/30011* (2013.01); *G06F 17/30899* (2013.01)

(58) Field of Classification Search
CPC .......... G06F 17/30867; G06F 17/30693; G06F 17/3089; G06F 17/30038; G06F 17/30247; G06F 17/3064; G06F 17/30011; G06F 17/30017; G06F 17/30651; G06F 17/30873; G06F 17/30899; G06F 9/4443; G06F 17/241; G06F 17/30864; G06F 3/0481; G06F 17/212; G06F 17/211; G06F 17/30905; G06F 3/0484; G06F 17/30029; G06F 17/30528; G06F 17/30554; G06F 17/30696; G06F 17/03; G06F 17/278; G06F 17/30253; G06F 17/30991; G06F 3/04812; G06F 3/04842; G06F 17/3028; G06F 17/30616; G06F 3/048; G06Q 30/0631; G06Q 30/0256; H04L 67/22; H04W 4/18
USPC .................................................. 707/732, 758
See application file for complete search history.

(56) References Cited

U.S. PATENT DOCUMENTS

| | | | |
|---|---|---|---|
| 7,127,473 B2 | 10/2006 | Agassi et al. | |
| 7,284,008 B2 | 10/2007 | Henkin et al. | |
| 7,321,887 B2 | 1/2008 | Dorner et al. | |
| 7,451,152 B2 | 11/2008 | Kraft et al. | |
| 7,783,622 B1 * | 8/2010 | Vandermolen et al. | 707/708 |
| 7,962,444 B2 | 6/2011 | Maiocci | |

(Continued)

OTHER PUBLICATIONS

Witten et al., "Text mining in a digital library", Published online: Jul. 23, 2004—International Journal on Digital Libraries, Aug. 2004, vol. 4, Issue 1, pp. 56-59.*

Bayer, "Semantically Grouped Browser Tabs" Jun. 3, 2009 [online], [retrieved on Nov. 15, 2012]. Retrieved from the Internet <URL: http://www.slideshare.net/SteveJB/semantically-grouped-browser-tabs-steve-jb>.

(Continued)

*Primary Examiner* — Evan Aspinwall

(74) *Attorney, Agent, or Firm* — Brandon C. Kennedy; Grant A. Johnson; Kennedy Lenart Spraggins LLP

(57) ABSTRACT

A method for identifying content in a document. The method includes determining that a user of a computing device has accessed one or more documents and determining a subject matter of the one or more documents. The method includes determining that the user has accessed at least one additional document. The method further includes searching the at least one additional document for the determined subject matter and responsive to finding the determined subject matter, identifying the found subject matter in the at least one additional document.

20 Claims, 4 Drawing Sheets

(56) References Cited

U.S. PATENT DOCUMENTS

| | | | |
|---|---|---|---|
| 8,069,405 | B1 | 11/2011 | Bartz et al. |
| 8,131,767 | B2 | 3/2012 | Brindley |
| 8,191,007 | B1 | 5/2012 | Veloz, III |
| 8,671,106 | B1* | 3/2014 | Lee et al. ............... 707/767 |
| 8,799,273 | B1* | 8/2014 | Chang ............ G06F 17/3089 707/722 |
| 8,886,648 | B1* | 11/2014 | Procopio ........ G06F 17/30663 707/737 |
| 2003/0217061 | A1 | 11/2003 | Agassi et al. |
| 2004/0064431 | A1 | 4/2004 | Dorner et al. |
| 2005/0209989 | A1* | 9/2005 | Albornoz ........... G06F 17/2235 |
| 2006/0047651 | A1* | 3/2006 | Milic-Frayling . G06F 17/30867 |
| 2006/0156222 | A1* | 7/2006 | Chi et al. ............... 715/512 |
| 2009/0037822 | A1 | 2/2009 | Kandekar et al. |
| 2009/0113346 | A1 | 4/2009 | Wickramasuriya et al. |
| 2009/0234808 | A1* | 9/2009 | Zarzar et al. ............ 707/3 |
| 2009/0248510 | A1 | 10/2009 | Ahluwalia |
| 2009/0249256 | A1 | 10/2009 | Brzeski et al. |
| 2009/0287646 | A1 | 11/2009 | Maciocci |
| 2010/0180001 | A1 | 7/2010 | Hardt |
| 2011/0035289 | A1 | 2/2011 | King et al. |
| 2011/0035345 | A1 | 2/2011 | Duan et al. |
| 2011/0131523 | A1 | 6/2011 | Grant et al. |
| 2011/0181775 | A1 | 7/2011 | Canova et al. |
| 2011/0208732 | A1* | 8/2011 | Melton et al. ............. 707/728 |
| 2011/0213655 | A1 | 9/2011 | Henkin et al. |
| 2011/0296323 | A1 | 12/2011 | Oh |
| 2012/0072859 | A1* | 3/2012 | Wang et al. ............. 715/764 |
| 2012/0093354 | A1* | 4/2012 | Kletter ............. G06K 9/00456 382/100 |
| 2012/0216124 | A1 | 8/2012 | Martino et al. |
| 2013/0110823 | A1* | 5/2013 | Su ............. G06F 17/30867 707/723 |

OTHER PUBLICATIONS

Chu et al., "A Knowledge-based Approach for Scenario-specific Content Correlation in a Medical Digital Library*" [online], [retrieved on Nov. 15, 2012]. Retrieved from the Internet <URL: https://docs.google.com/viewer?a=v &q=cache:ahA1SjGmzpUJ:citeseerx.ist.psu.edu/viewdoc/ download?doi%3D10.1.1.12.2526%26rep%3Drep1%26type% 3Dpdf+automatically+correlating+document+contents+among+ running+applications&hl=en&gl=us&pid=bl&srcid=ADGEES iansw8SP8ByfeTQewieU-8FdMr13mCollrzF80DuGu4MEit_ pgYwfcdibikyDK8HvbQVKEoMsdhQTuwN3UtQIQ-OI_ R0QvQX8EwT7LbHVejbLXu6WY4bOR6_G19wve01dxc6H9 &sig=AHIEtbT84oo/7TUMkJ8DQlqN58V8ebi83Pg>.

In-spire.pnnl.gov, "Correlation Tool" Jun. 21, 2005 [online], [retrieved on Nov. 15, 2012]. Retrieved from the Internet <URL: http://in-spire.pnnl.gov/IN-SPIRE_Help/Correlation_Tool.htm>.

River-Of-Time.Blogspot.In, "The River of Time: [Proposal] Mozilla Design Challenge Summer 2009—Reinventing Tabs in Browser" Jun. 7, 2009 [online], [retrieved on Nov. 15, 2012]. Retrieved from the Internet <URL: http://river-of-time.blogspot.in/ 2009/06/proposal-mozilla-design-challenge.html>.

Viji, "Term and Document Correlation and Visualization for a set of Documents" [online], [retrieved on Nov. 15, 2012]. Retrieved from the Internet <URL: http://www.google.com/url?sa=t&rct=j &q=highlight%20text%20color%20document%20correlation %20keyword&source=web&cd=2&ved=0CFMQFjAB &url=http%3A%2F%2Fwww.stanford. edu%2Fclass%2Farchive%2Fcs%2Fcs276a%2Fcs276a. 1032%2Fprojects%2Freports%2Fsviji.doc &ei=OXYZUKaCBoqa8gTojoG4BA &usg=AFQjCNGXJELcxPpljYvTflfAC4BPPyhXdQ&cad=rja>.

* cited by examiner

GUIDING A USER TO IDENTIFIED CONTENT IN A DOCUMENT

FIELD OF THE INVENTION

The present invention relates generally to the field of document and web browser viewing, and more particularly to guiding a user to identified content in a document, where the content is identified based on categories of content found in other open documents.

BACKGROUND OF THE INVENTION

When working in a computing environment, such as an Integrated Development Environment (IDE) or web browser environment, a plurality of windows are often opened and displayed to a user. Depending on the environment, the windows may comprise, for example, elements such as programs, files, documents, web pages, etc. Additionally, users may have a large number of windows open at any given time, and, especially in a web browser environment, each window may include multiple tabs, making it difficult to navigate through the windows in an efficient and organized manner.

SUMMARY

Embodiments of the present invention disclose a computer-implemented method, computer program product, and computer system for identifying content in a document. The method includes, determining, by a computing device, that a user of the computing device has accessed one or more documents and determining, by the computing device, a subject matter of the one or more documents. The method includes determining, by the computing device, that the user has accessed at least one additional document. The method further includes searching the at least one additional document for the determined subject matter and responsive to finding the determined subject matter, identifying the found subject matter in the at least one additional document.

DETAILED DESCRIPTION

Figure 1:
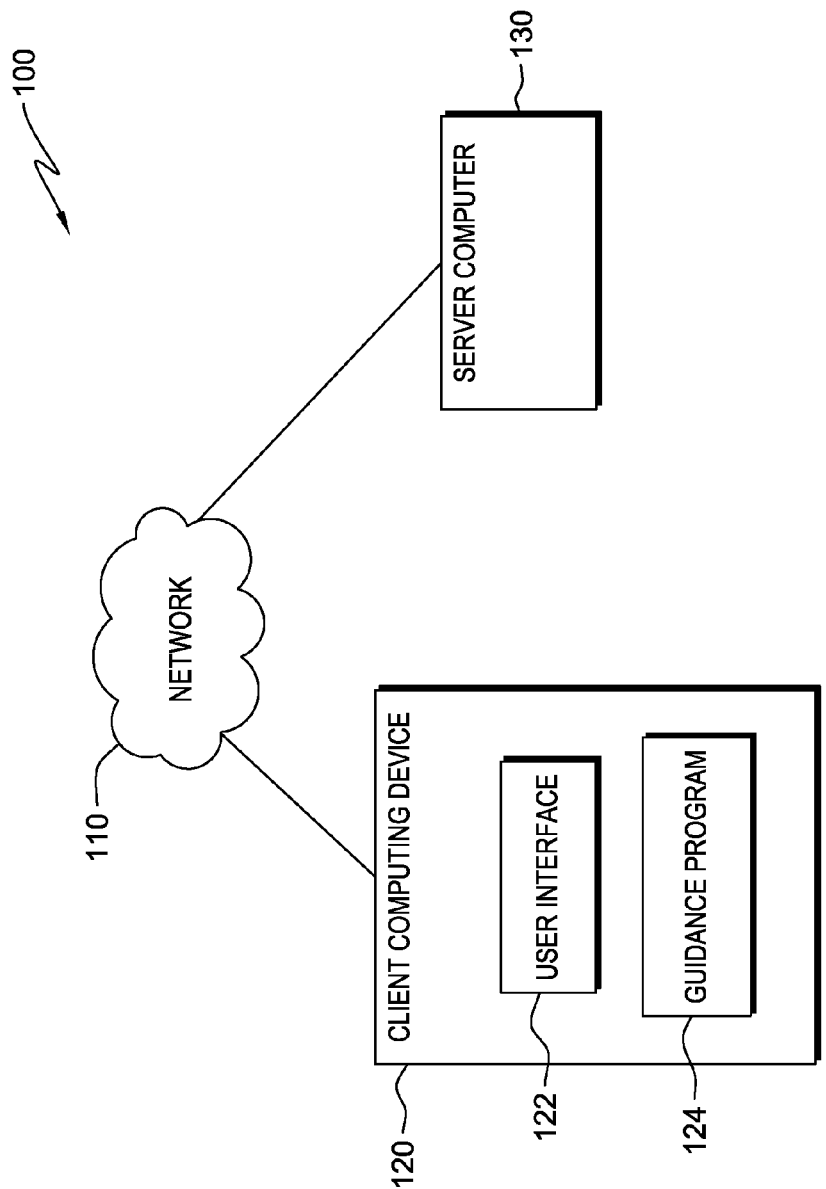
FIG. 1 is a functional block diagram illustrating a distributed data processing environment, including a client computing device and a server computer, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes client computing device 120 and server computer 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client computing device 120 and server computer 130.

In various embodiments of the present invention, client computing device 120 can be a laptop computer, tablet computer, netbook computer, personal computer (PC), a desktop computer, a personal digital assistant (PDA), a smart phone, or any programmable electronic device capable of communicating with server computer 130 via network 110. In this exemplary embodiment, client computing device 120 includes user interface (UI) 122 and guidance program 124. UI 122 may be, for example, a graphical user interface (GUI) or a web user interface (WUI) and can display text, documents, web browser windows, user options, instructions for operation and other instruments containing text or graphical elements.

Guidance program 124 determines content or subject matter of documents a user currently has open, and categorizes the content of open documents based on similarity of subject matter among the open documents. In various embodiments, a document can be, for example, an open web browser page, a word processing document, a file folder, a spreadsheet or any other file containing information in a digital format, for example, text or graphical elements, that may be displayed on UI 122 on client computing device 120 and viewed by a user. The content or subject matter categories of the open documents are indicated visually to the user by, for example, colored tabs or text. As the user opens a new document, or navigates between open documents, guidance program 124 highlights, or otherwise identifies, content or items of interest on the newly opened or currently displayed document based on the pre-determined content categories. While in FIG. 1, guidance program 124 is included in client computing device 120, one of skill in the art will appreciate that in other embodiments, guidance program 124 may be located elsewhere within distributed data processing environment 100 and can communicate with client computing device 120 via network 110.

Server computer 130 may include data storage or function as part of the World Wide Web (WWW) and can include spreadsheets, web browser pages or other documents that can be searched for and downloaded to client computing device 120 for viewing by a user. Server computer 130 can be a laptop computer, tablet computer, netbook computer, personal computer (PC), a desktop computer, a personal digital assistant (PDA), a smart phone, or any programmable electronic device capable of communicating with client computing device 120 via network 110 and with various components and devices within distributed data processing environment 100. Server computer 130 may include internal and external hardware components, as depicted and described in further detail with respect to FIG. 4.

Figure 2:
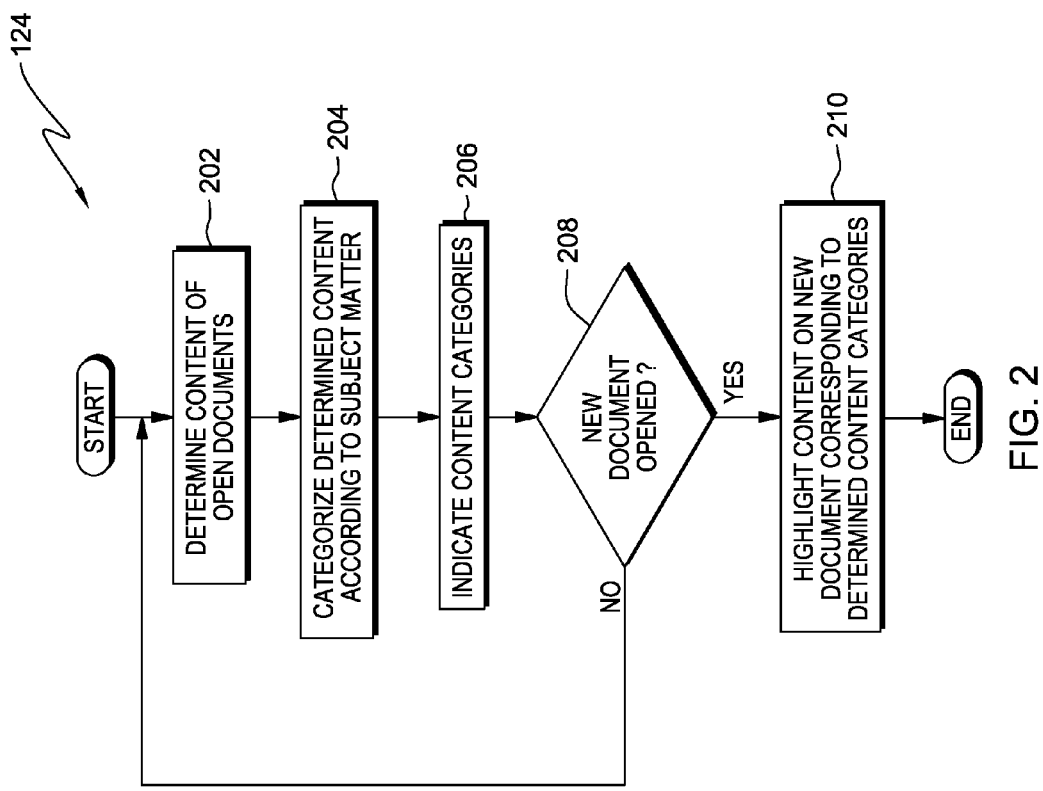
FIG. 2 is a flowchart depicting operational steps of a guidance program for guiding a user to content or items of interest to the user in a document, in accordance with an embodiment of the present invention.

FIG. 2 is a flowchart depicting operational steps of guidance program 124 for guiding a user to content or items of interest to the user in a document, in accordance with an embodiment of the present invention.

Guidance program 124 determines the content of open documents (step 202). Content may be embodied, for example, as key words, graphics, content tags, or user-defined topics. Open documents may include, for example, web browser pages, spreadsheets, word processing documents, or any other variety of application software capable of displaying content. In various embodiments of the present invention, guidance program 124 can determine the content of an open document as the content is updated and the document refreshed or can determine the content of newly opened documents.

Guidance program 124 categorizes the determined content according to subject matter (step 204). In an exemplary embodiment, a user may have several research related documents, including a word processing document containing notes or a report of a historical event, open on a client device, for example, client computing device 120, and the user may also have several web browser pages open, including a social networking site, a sports news website and an online encyclopedia. Guidance program 124 may determine two categories for the content of each open page, for example, content related either to personal interests, e.g., the social networking site and the sports news website, or to historical events, e.g., the word processing document containing notes or the report of a historical event, and the online encyclopedia.

Guidance program 124 indicates content categories (step 206). In the embodiment discussed above, guidance program 124 determined various categories, such as personal interests and historical events. Guidance program 124 indicates the content categories to the user, for example, visually, with colored tabs, highlighted text, or annotating the document with additional wording on the open browser tab or document. In an exemplary embodiment, open documents categorized as personal interests may include the term "personal" on the web browser tab, in addition to any text already included on the web browser tab, as an indication of the determined categories or content in the open documents.

Guidance program 124 determines whether a user has opened a new document (decision block 208). If a user does not open a new document (decision block 208, no branch), guidance program 124 continues to determine the content of open documents.

If a user does open a new document (decision block 208, yes branch), guidance program 124 highlights, or otherwise identifies, content on the new document that corresponds to determined content categories (step 210). In various embodiments, if the new document contains content that does not correspond to a determined content category, guidance program 124 determines a new content category. The identified content or items of interest may be indicated to the user by, for example, colored text, including coloring the corresponding text in the same color as the determined content category, changing the font type or style, arrows pointing to the corresponding content, surrounding the corresponding content with a box or circle, or any other manner to notify the user of the corresponding content. In various embodiments of the present invention, the manner in which content categories are indicated to the user may change as additional documents are opened. For example, the determined content of a majority of open documents may relate to a same, or similar, subject matter, thus allowing the subject matter to be heavily weighted. As new documents are opened, the heavily weighted subject matter is prioritized and may be identified in such a manner to allow the heavily weighted subject matter to stand out more than other subject matter.

In various embodiments of the present invention, the user may manage determined content categories by, for example, adjusting the level of granularity of a content category, allowing guidance program 124 to highlight a sub-topic of a determined content category. Alternately, the user may add or remove a determined content category from an indexed list. Guidance program 124 can then cease highlighting the determined content category on a new document.

Figure 3:
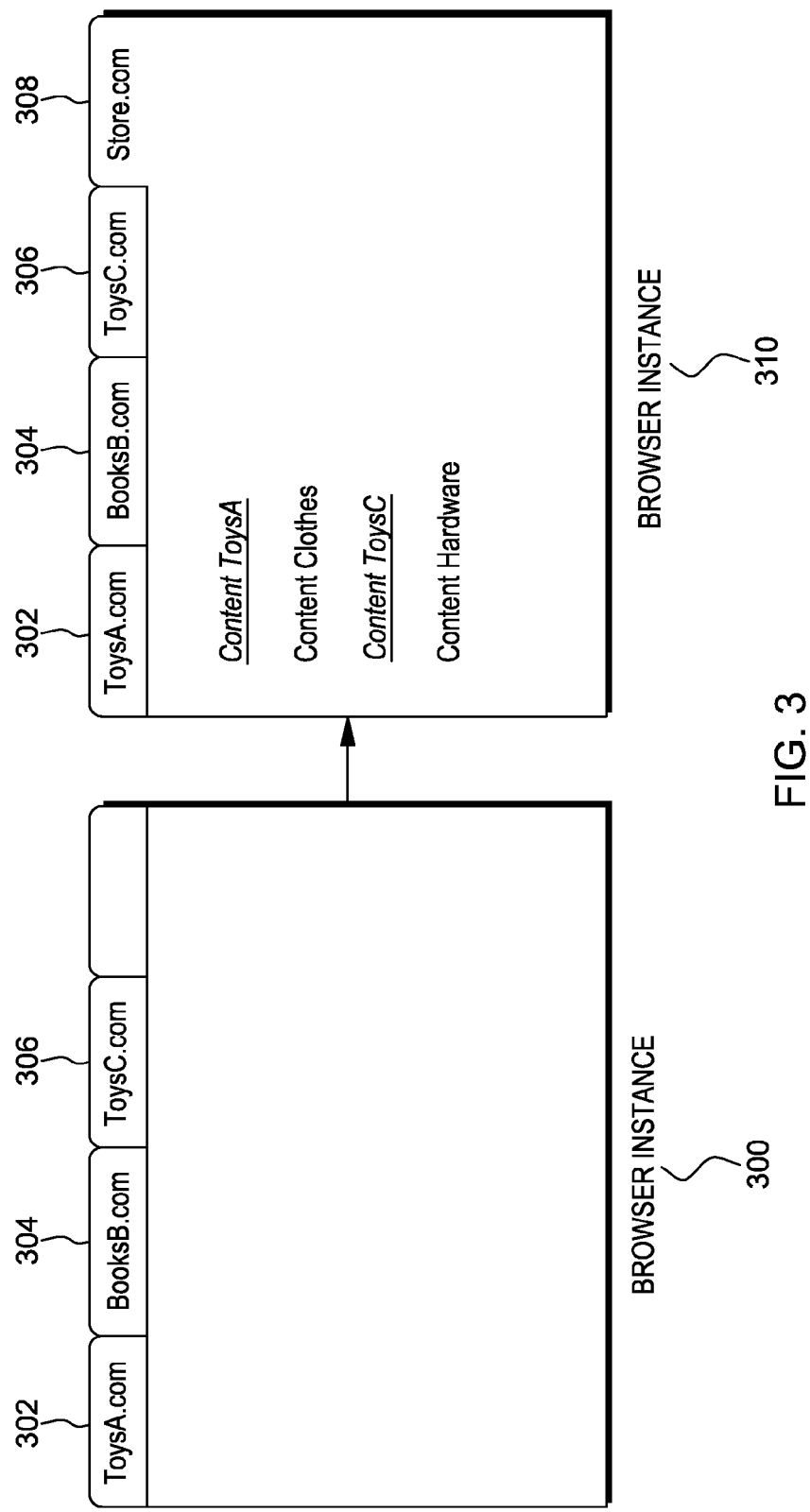
FIG. 3 illustrates an exemplary user interface depicting operation of the guidance program of FIG. 2, in accordance with an embodiment of the present invention.

FIG. 3 illustrates an exemplary user interface depicting operation of guidance program 124, in accordance with an embodiment of the present invention.

In the exemplary embodiment depicted in FIG. 3, a user views browser instance 300, which contains three open web browser tabs, website 302, website 304 and website 306. Guidance program 124 determines the content of each open browser tab and visually indicates content categories to the user, based on similar subject matter. For example, website 302 and website 306 contain similar content related to toys, while website 304 contains content regarding books.

In browser instance 310, the user has opened a fourth web browser tab, store website 308. Guidance program 124 identifies content on store website 308 that corresponds to previously determined content categories, for example, toys. The user can then quickly navigate to the content and items of interest on the newly opened web browser tab, store website 308, that is related to previously viewed content.

Figure 4:
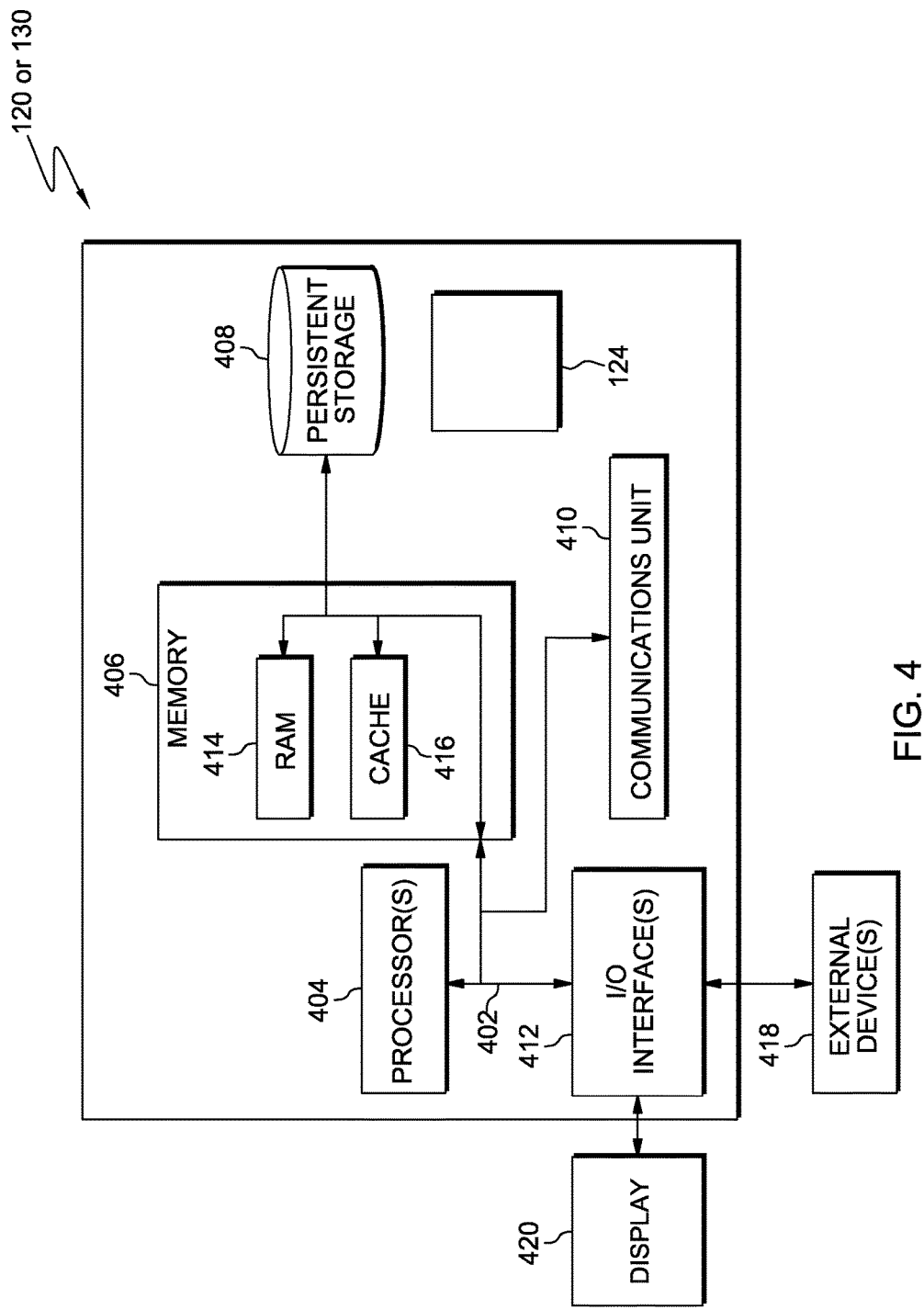
FIG. 4 depicts a block diagram of components of the client computing device or the server computer of FIG. 1, in accordance with an embodiment of the present invention.

FIG. 4 depicts a block diagram of components of client computing device 120 or server computer 130, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server computer 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Guidance program 124 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120 and server computer 130. In these examples, communications unit 410 includes one or more network interface cards. Communications unit 410 may provide communications through the use of either or both physical and wireless communications links. Guidance program 124 may be downloaded to persistent storage 408 through communications unit 410.

I/O interface(s) 412 allows for input and output of data with other devices that may be connected to client computing device 120 and server computer 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., guidance program 124, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for identifying content in a document, the method comprising:
    identifying within each document of a plurality of open documents, by a computing device, content corresponding to a particular subject matter category;
    in response to the computing device opening an additional document, identifying within the additional document, by the computer device, additional content corresponding to the particular subject matter category;
    providing, within the additional document, an indicator that visually distinguishes the identified additional content from the other content within the additional document;
    in response to the computing device opening a second additional document and content of the second additional document not corresponding to the particular subject matter category, determining a new subject matter category corresponding to the content of the second additional document;
    determining a majority of the plurality of open documents of the computing device relate to similar subject matter, wherein the particular subject matter category relates to the similar subject matter;
    in response to determining that the majority of the plurality of open documents of the computing device relate to the similar subject matter, assigning a weight to the similar subject matter and the new subject matter category, wherein the similar subject matter is more heavily weighted than the new subject matter category; and
    providing, based on the assigned weights, indicators that visually distinguish documents relating to the similar subject matter category from documents relating to the new subject matter category.

2. The method of claim 1, wherein the plurality of open documents and the additional document comprise one or more of word processing documents, spreadsheets, text editing files, presentation documents or web browser pages.

3. The method of claim 1, wherein identifying within the additional document, by the computer device, additional content corresponding to the particular subject matter category includes at least one of: marking the additional content by using colored text, arrows pointing to the additional content, geometric figures surrounding the additional content, changing font type or style, and annotating the additional document.

4. The method of claim 1, wherein identifying within each document of a plurality of open documents, by a computing device, content corresponding to a particular subject matter category includes determining a title of content within the plurality of open documents.

5. The method of claim 1, wherein identifying within each document of a plurality of open documents, by a computing device, content corresponding to a particular subject matter category includes searching one or both of text and graphical elements of the additional document for additional content.

6. The method of claim 1, further comprising:
    prioritizing the similar subject matter based as least in part on the weight; and
    responsive to the prioritizing, identifying the similar subject matter in the additional document with an additional indication.

7. The method of claim 1, in response to the computing device opening an additional document, adjusting the manner in which the indicators of the subject matter categories are visually represented.

8. The method of claim 1, adjusting the manner in which the indicators of the subject matter categories are visually represented based as least in part on the weight.

9. The method of claim 1, managing the subject matter categories by adjusting a level of granularity of the determined subject matter categories or adding or removing a particular determined subject matter category from an indexed list.

10. The method of claim 1, further comprising:
    determining the majority of the plurality of open documents of the computing device relate to the new subject matter category; and
    in response to determining that the majority of the plurality of open documents of the computing device relate to the new subject matter category, assigning a heavier weight to the new subject matter category than to the similar subject matter; and
    providing indicators that make the indicator associated with the new subject matter category more visually pronounced than the indicator associated with the similar subject matter.

11. A computer program product for identifying content in a document, the computer program product comprising:
    a computer readable storage medium, wherein the computer readable storage medium is not a signal, wherein the computer readable storage medium includes program instructions that when executed by a computer cause the computer to carry out the steps of:
        identifying within each document of a plurality of open documents, by a computing device, content corresponding to a particular subject matter category;
        in response to the computing device opening an additional document, identifying within the additional document, by the computer device, additional content corresponding to the particular subject matter category;
        providing, within the additional document, an indicator that visually distinguishes the identified additional content from the other content within the additional document;
        in response to the computing device opening a second additional document and content of the second additional document not corresponding to the particular subject matter category, determining a new subject matter category corresponding to the content of the second additional document;
        determining a majority of the plurality of open documents of the computing device relate to similar subject matter, wherein the particular subject matter category relates to the similar subject matter;

in response to determining that the majority of the plurality of open documents of the computing device relate to the similar subject matter, assigning a weight to the similar subject matter and the new subject matter category, wherein the similar subject matter is more heavily weighted than the new subject matter category; and providing indicators that visually distinguish documents relating to the similar subject matter category from documents relating to the new subject matter category.

12. The computer program product of claim 11, wherein the plurality of open documents and the additional document comprise one or more of word processing documents, spreadsheets, text editing files, presentation documents or web browser pages.

13. The computer program product of claim 11, wherein identifying within the additional document, by the computer device, additional content corresponding to the particular subject matter category includes at least one of: marking the additional content using colored text, arrows pointing to the additional content, geometric figures surrounding the additional content, changing font type or style, and annotating the additional content of the additional document.

14. The computer program product of claim 11, wherein identifying within each document of a plurality of open documents, by a computing device, content corresponding to a particular subject matter category includes determining a title of content within the plurality of open documents.

15. The computer program product of claim 11, wherein identifying within each document of a plurality of open documents, by a computing device, content corresponding to a particular subject matter category includes searching one or both of text and graphical elements of the additional document for the additional content.

16. A computer system for identifying content in a document, the computer system comprising:
one or more computer processors;
a computer readable storage medium that is not a signal;
the computer readable storage medium including program instructions that when executed by the one or more computer processors cause the computer system to carry out the steps of:
identifying within each document of a plurality of open documents, by a computing device, content corresponding to a particular subject matter category;
in response to the computing device opening an additional document, identifying within the additional document, by the computer device, additional content corresponding to the particular subject matter category;
providing, within the additional document, an indicator that visually distinguishes the identified additional content from the other content within the additional document;
in response to the computing device opening a second additional document and content of the second additional document not corresponding to the particular subject matter category, determining a new subject matter category corresponding to the content of the second additional document;
determining a majority of the plurality of open documents of the computing device relate to similar subject matter, wherein the particular subject matter category relates to the similar subject matter;
in response to determining that the majority of the plurality of open documents of the computing device relate to the similar subject matter, assigning a weight to the similar subject matter and the new subject matter category, wherein the similar subject matter is more heavily weighted than the new subject matter category; and
providing indicators that visually distinguish documents relating to the similar subject matter category from documents relating to the new subject matter category.

17. The computer system of claim 16, wherein the plurality of open documents and the additional document comprise one or more of word processing documents, spreadsheets, text editing files, presentation documents or web browser pages.

18. The computer system of claim 16, wherein identifying within the additional document, by the computer device, additional content corresponding to the particular subject matter category includes at least one of: marking the additional content by using colored text, arrows pointing to the additional content, geometric figures surrounding the additional content, changing font type or style, and annotating the additional document.

19. The computer system of claim 16, wherein identifying within each document of a plurality of open documents, by a computing device, content corresponding to a particular subject matter category includes determining a title of content within the plurality of open documents.

20. The computer system of claim 16, wherein identifying within each document of a plurality of open documents, by a computing device, content corresponding to a particular subject matter category includes searching one or both of text and graphical elements of the additional document for content.

* * * * *